United States Patent
Latham et al.

(10) Patent No.: US 10,291,160 B1
(45) Date of Patent: May 14, 2019

(54) METHOD FOR OPERATING A SYNCHRONOUS MOTOR

(71) Applicants: Haier US Appliance Solutions, Inc., Wilmington, DE (US); University of Louisville Research Foundation, Inc., Louisville, KY (US)

(72) Inventors: Joseph Wilson Latham, Louisville, KY (US); Paul Goodjohn, Crestwood, KY (US); Michael Lee McIntyre, Louisville, KY (US)

(73) Assignees: Haier US Appliance Solutions, Inc., Wilmington, DE (US); University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 15/916,320

(22) Filed: Mar. 9, 2018

(51) Int. Cl.
| | |
|---|---|
| H02P 6/06 | (2006.01) |
| H02P 6/08 | (2016.01) |
| H02P 21/09 | (2016.01) |
| H02P 21/18 | (2016.01) |
| H02P 6/185 | (2016.01) |
| H02K 21/12 | (2006.01) |

(52) U.S. Cl.
CPC ............... *H02P 6/06* (2013.01); *H02K 21/12* (2013.01); *H02P 6/08* (2013.01); *H02P 6/185* (2013.01); *H02P 21/09* (2016.02); *H02P 21/18* (2016.02); *H02P 2207/05* (2013.01)

(58) Field of Classification Search
CPC ...... H02P 1/00; H02P 1/46; H02P 3/18; H02P 1/24; H02P 1/42; H02P 6/00; H02P 6/14; H02P 21/00; H02P 27/04; H02P 27/06; G05B 11/28

USPC ......... 318/400.01, 400.02, 400.14, 700, 701, 318/721, 779, 799, 800, 801, 430, 432, 318/599; 361/23, 30
See application file for complete search history.

(56) References Cited

U.S. PATENT DOCUMENTS

| | | | |
|---|---|---|---|
| 7,560,894 B2 | 7/2009 | Salomaki et al. | |
| 7,759,897 B2 * | 7/2010 | Piippo | H02P 6/183 318/700 |
| 9,660,564 B2 * | 5/2017 | Zhao | H02P 21/0021 |

OTHER PUBLICATIONS

Vasilios C. Ilioudis, PLL Type Estimator Applied in PMSM Sensorless Control for Speed and Position, 2017 Twelfth International Conference on Ecological Vehicles and Renewable Energies, 978-1-5386-1692, European Union, May 2017, 1-8.

Oliver Benjak and DIE1ER Gerling, Review of Position Estimation Methods for PMSM Drives Without a Position Sensor, Part III: Methods based on Saliency and Signal Injection, 2010 International Conference on Electrical Machines and Systems, Oct. 10, 2010, 873-878.

* cited by examiner

*Primary Examiner* — Antony M Paul
(74) *Attorney, Agent, or Firm* — Dority & Manning, P.A.

(57) ABSTRACT

A method of operating a synchronous motor includes using a rotor angle observer model to calculate an observed rotor angle and a speed estimator model to calculate an observed angular speed of the rotor. The observed rotor angle may be used to ensure that the stator magnetic field generated by the stator is oriented 90° ahead of the rotor magnetic field. The observed angular speed may be used to regulate the motor operation to achieve the desired speed.

20 Claims, 4 Drawing Sheets

METHOD FOR OPERATING A SYNCHRONOUS MOTOR

FIELD OF THE INVENTION

The present subject matter relates generally to motors and associated methods of operation, and more particularly, to methods for operating a synchronous motor using a rotor angle observer model.

BACKGROUND OF THE INVENTION

Synchronous-type motors operating in field-oriented control are commonly used in applications which require high efficiency and high-fidelity speed/position control. Synchronous motors are AC motors typically including stators having multi-phase AC electromagnets which generate a rotating magnetic field. A rotor may contain permanent magnets or electromagnets which interact with the stator magnetic field to rotate at the same speed.

Field-oriented control is a method of regulating stator currents in a three-phase synchronous motor. Field-oriented control typically includes determining the motor magnetic field within three spatial axes (e.g., a, b, c axes associated with the respective stator electromagnets) and projecting these magnetic fields onto complex two-phase axes (e.g., α, β axes) using the Clarke variable transformation. From this set of axes, the Park variable transformation may be used to project the magnetic fields onto the direct axis (d) and quadrature axis (q) which define a rotating reference frame. The rotor magnetic field ($\vec{B}_r$) and the stator magnetic field ($\vec{B}_s$) may be projected in this dq reference frame for modeling purposes. Notably, it is desirable to orient the stator magnetic field ($\vec{B}_s$) 90° ahead of the rotor magnetic field ($\vec{B}_r$) for maximum torque production. Field-oriented control is used to maintain this desired orientation.

However, field-oriented control requires accurate knowledge of the flux angle or rotor magnetic field ($\vec{B}_r$) of the rotor to correctly orient the stator magnetic field ($\vec{B}_s$). Additionally, a speed signal may be useful for speed control. This information could be acquired directly through some type of sensor, but for cost and reliability purposes sensorless solutions are generally preferred.

Sensorless solutions for field-oriented control typically use observers to estimate the back electromotive force (EMF) of the motor in the stationary reference frame (usually the αβ, but also the abc reference frame) and then feed these back EMF signals into a phase-locked loop (PLL) using a dq (direct-quadrature) transformation. However, these solutions suffer from the compounding of error in the αβ observed back EMFs which are combined via the dq to obtain a third error signal for the PLL. Moreover, in the αβ frame, the back EMF signals are time-varying (sinusoidal or trapezoidal depending on motor type), and thus difficult to reliably track.

Accordingly, a synchronous motor that operates using improved field-oriented control would be desirable. More particularly, a system and method for operating a synchronous motor with fewer sensors and improved torque and speed response would be particularly beneficial.

BRIEF DESCRIPTION OF THE INVENTION

The present disclosure relates generally to a method of operating a synchronous motor including using a rotor angle observer model to calculate an observed rotor angle and a speed estimator model to calculate an observed angular speed of the rotor. The observed rotor angle may be used to ensure that the stator magnetic field generated by the stator is oriented 90° ahead of the rotor magnetic field. The observed angular speed may be used to regulate the motor operation to achieve the desired speed. Additional aspects and advantages of the invention will be set forth in part in the following description, or may be apparent from the description, or may be learned through practice of the invention.

In one exemplary embodiment, a method for operating a synchronous motor comprising a rotor and a stator is provided. The method includes obtaining an induced stator current error projected onto an estimated d'-axis within a direct-quadrature (d'q') rotating reference frame and obtaining an observed angular speed of the rotor based at least in part on the induced stator current error. The method further includes calculating an observed rotor angle of the rotor using a rotor angle observer model based on the angular speed of the rotor and the induced stator current error and generating a stator magnetic field based at least in part on the observed rotor angle.

In another exemplary embodiment, a method for operating a synchronous motor comprising a rotor and a stator is provided. The method includes obtaining an estimated electrical angle of the rotor and obtaining an applied stator voltage and an induced stator current in windings of the stator in an αβ stationary reference frame. The method further includes calculating the applied stator voltage and the induced stator current in a d'q' rotating reference frame using the estimated electrical angle of the rotor and calculating an observed induced stator current projected onto a d'-axis within a direct-quadrature (d'q') rotating reference frame using an induced current observer model.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
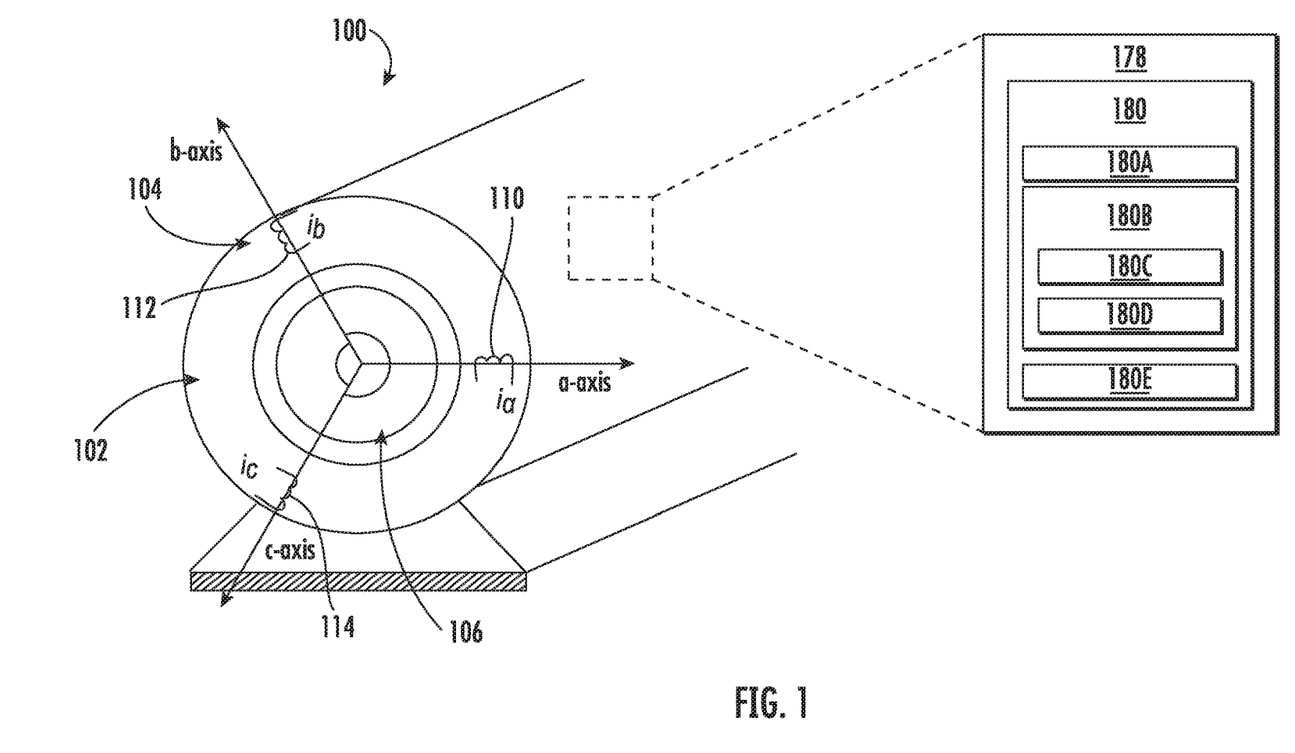
FIG. 1 is a schematic representation of a three-phase synchronous motor and the position of its three phase windings according to an exemplary embodiment of the present subject matter.

FIG. 1 depicts a schematic view of a synchronous motor 100 according to an exemplary embodiment of the present subject matter. Although a three-phase synchronous motor is used herein to describe aspects of the present subject matter, it should be appreciated that the present subject matter is not limited to use in a synchronous motor or the exemplary configuration shown and described herein. Thus, the present subject matter may be adapted for use with other motor types and configurations, such as other suitable AC motors, e.g., an induction motor, a permanent magnet synchronous motor, as well as brushless DC motors or any other suitable type of motor.

As explained briefly above, field-oriented control of an electric motor, such as synchronous motor 100, requires accurate knowledge of the flux angle of the rotor magnet in order to correctly orient the stator magnetic field to achieve maximum torque. The methods described herein and the operating models and control diagrams formulated below are intended at least in part to facilitate improved control of an electric motor, such as synchronous motor 100. Specifically, an observer solution is proposed which is able to directly estimate the angular position and speed of the rotor in order to implement field-oriented control. In addition, the observer model may be used to control synchronous motor 100 without requiring complex and expensive sensors, resulting in less costly and more reliable motors.

Referring now to FIG. 1, the construction of synchronous motor 100 will be described according to an exemplary embodiment. As illustrated, synchronous motor 100 includes a stator 102 that includes three-phase windings 104 placed approximately 120° apart physically around a rotor 106. It should be appreciated that as used herein, terms of approximation, such as "approximately," "substantially," or "about," refer to being within a ten percent margin of error.

According to an exemplary embodiment, magnetic windings 104 may be formed from insulated conductive wire. When assembled, the magnetic windings 104 may be circumferentially positioned about rotor 106 to electromagnetically engage and drive rotation of rotor 106, as described herein. In general, the voltages which excite the windings 104 are typically sine waves of equal amplitude and frequency which are separated in phase by 120° (i.e., ⅓ of a cycle). This results in induced sinusoidal currents which are similarly separated by 120°.

Specifically, stator 102 includes a first phase winding 110, a second phase winding 112, and a third phase winding 114. The voltages applied to each winding (i.e., $v_a$, $v_b$, and $v_c$, respectively) induce current in each winding 104 (i.e., $i_a$, $i_b$, and $i_c$, respectively). The induced currents ($i_a$, $i_b$, $i_c$) change magnitude and direction corresponding to the sine wave voltages ($v_a$, $v_b$, $v_c$), thereby generating a varying magnetic field along an associated field direction. Specifically, as shown in FIG. 1, first phase winding 110 generates a first varying magnetic field having a field vector extending along an a-axis, second phase winding 112 generates a second varying magnetic field having a field vector extending along an b-axis, and third phase winding 114 generates a third varying magnetic field having a field vector extending along a c-axis.

During operation, windings 104 work together to generate three-phase currents which generated a rotating magnetic field. Specifically, the magnetic fields generated by first phase winding 110, second phase winding 112, and third phase winding 114 can be summed to generate the stator magnetic field ($\vec{B}_s$) which for phase currents of constant sinusoidal amplitude has a constant magnitude and rotates at the input frequency. In addition, rotor 106 may be magnetized to generate a rotor magnetic field ($\vec{B}_r$) which interacts with the stator magnetic field ($\vec{B}_s$) such that rotor 106 rotates at substantially the same speed as the stator magnetic field ($\vec{B}_s$). According to exemplary embodiments, the magnetization of rotor 106 is produced by a permanent magnet in brushless designs or by windings, with a DC current supplied through slip rings or brushes, or in any other suitable manner. Thus, when stator 102 is energized with the appropriate power, rotor 106 is caused to rotate while stator 102 remains fixed.

Figure 2:
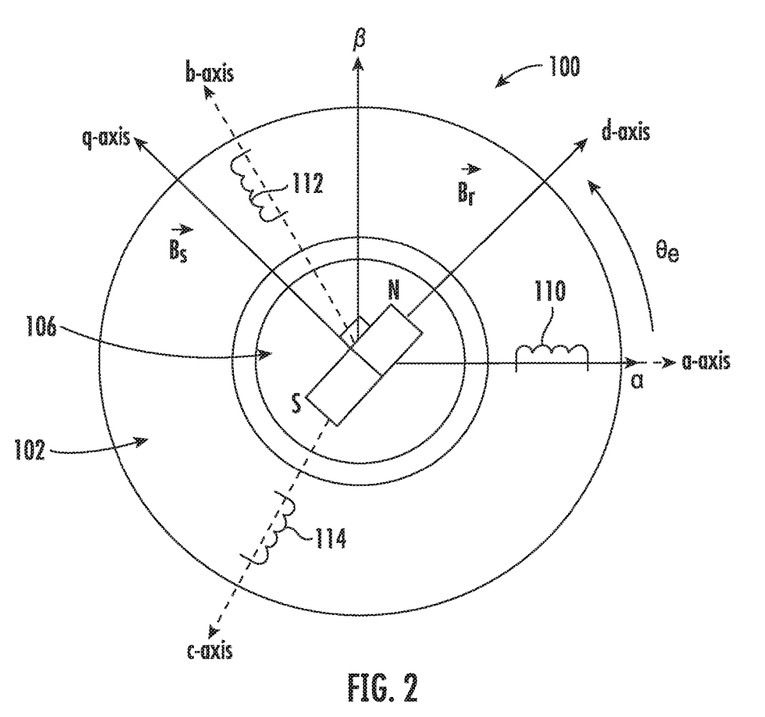
FIG. 2 is a schematic representation of the magnetic fields generated by a rotor and a stator of the exemplary synchronous motor of FIG. 1 in an abc stationary reference frame, an αβ stationary reference frame, and a dq rotating reference frame according to an exemplary embodiment of the present subject matter.

Referring now to FIG. 2, another schematic view of synchronous motor 100 is provided illustrating two stationary reference frames and one rotating reference frame that are used in the formulation of the observer model herein. Specifically, a first reference frame is the abc spatial reference frame described above. However, using a mathematical transformation referred to herein as the alpha-beta transformation or the "Clarke" transformation, the three-phase circuit may be represented in a second stationary reference frame, referred to herein as the αβ reference frame for simplified analysis. In this regard, the sets of voltages and currents associated with the three phases of windings 104 may be represented by only two axes (α and β) which produce the same magnetic field. For voltages, the Clarke transformation is achieved using the following equation:

$$\begin{bmatrix} v_\alpha \\ v_\beta \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} v_a \\ v_b \\ v_c \end{bmatrix}$$

It should be noted that variations of the Clarke transformation, e.g., based on angle and amplitude, may be used according to alternative embodiments. Thus, although an exemplary Clarke transformation is provided herein as an example, it should be appreciated that variations on the Clarke transformation may be used according to alternative embodiments. Also, note that the same mathematical transformation may be applied to determine the induced currents in the αβ reference frame. Also, for sinusoidal phase voltages applied to windings and resulting sinusoidal currents, the resulting αβ variables are also sinusoidal. In addition, both the abc and αβ frames are called stationary reference frames because they break the variables into components which fall on axes which are fixed on the stator. Furthermore, it should be noted that in this definition, a and α axes have the same direction.

As explained above, windings 104 of stator 102 work together to generate three-phase currents which collectively generate the stator magnetic field ($\vec{B}_s$) which has a constant magnitude and rotates at the input frequency. The rotor magnetic field ($\vec{B}_r$) has a vector orientation that is independent of the stator magnetic field ($\vec{B}_s$) and the interaction between these two magnetic fields induces a torque in rotor 106. Notably, the torque is maximized when the stator magnetic field ($\vec{B}_s$) and the rotor magnetic field ($\vec{B}_s$) are 90° apart.

Therefore, if the angle of the rotor magnetic field ($\vec{B}_r$) can be determined or observed, the stator magnetic field ($\vec{B}_s$) may be oriented to always remain 90° ahead of it. This method of control may be referred to herein as field-oriented control. Exemplary methods of observing the angle of the rotor magnetic field ($\vec{B}_r$) are provided herein.

In order to track the rotor magnetic field ($\vec{B}_r$), another set of axes which rotate with the rotor magnetic field ($\vec{B}_r$) may be used. Specifically, as shown in FIG. 2, a direct axis (d) and a quadrature axis (q) form a dq reference frame which is used in the formulation of a rotor angle observer model below. In the equations below, the angle between the d axis and the a, α axis is denoted as $\theta_e$ (measured in a counter-clockwise direction). Thus, the currents and voltages applied to windings 104 can be projected onto the dq axes using a mathematical transformation referred to herein as the direct-quadrature transformation or the "Park" transformation. Although an exemplary Park transformation is provided below as an example, it should be appreciated that variations on the Park transformation may be used according to alternative embodiments. Notably, when the input voltages ($v_a$, $v_b$, $v_c$, or $v_\alpha$, $v_\beta$) and the induced currents ($i_a$, $i_b$, $i_c$ or $i_\alpha$, $i_\beta$) are sinusoidal, the resulting dq signals will be DC. For example, the voltages can be represented as follows:

$$\begin{bmatrix} v_d \\ v_q \end{bmatrix} = \begin{bmatrix} \cos(\theta_e) & \sin(\theta_e) \\ -\sin(\theta_e) & \cos(\theta_e) \end{bmatrix} \begin{bmatrix} v_\alpha \\ v_\beta \end{bmatrix}$$

Referring to FIGS. 1 and 2, various schematic representations of synchronous motor 100 including various reference frames, windings, and magnetic field vectors are illustrated. For convenience and to facilitate discussion below, a list of the system parameters and variables associated with the rotor angle observer is provided below in Table 1. However, it should be appreciated that fewer than all parameters may be listed here.

TABLE 1

List of Rotor Angle Observer Variables and Parameters

| Symbol | Parameter/Variable |
|---|---|
| $v_\alpha$, $v_\beta$ | Transformed applied stator voltages |
| $I_\alpha$, $I_\beta$ | Transformed induced stator currents |
| R | Resistance of the stator windings |
| L | Inductance of the stator windings |
| $k_e$ | The back EMF constant |
| $\theta_m$ | Mechanical angle of rotor |
| P | Number of poles in the stator |

TABLE 1-continued

List of Rotor Angle Observer Variables and Parameters

| Symbol | Parameter/Variable |
|---|---|
| $\theta_e$ | The electrical angle of the rotor ($\theta_e$ = P/2 $\theta_m$) |
| $v_d$ | Applied stator voltage projected onto the d-axis |
| $v_q$ | Applied stator voltage projected onto the q-axis |
| $I_d$ | Induced stator current projected onto the d-axis |
| $I_q$ | Induced stator current projected onto the q-axis |
| $\omega_m$ | Angular speed of the rotor |
| $\omega_e$ | Electrical speed of the rotor |
| $k_1$ | A real, positive gain value |
| $k_\omega$ | A real, positive gain value |
| $k_e$ | A real, positive gain value |

Various mathematical notations and accents are associated with variables or parameters used herein. Several of these notations and parameter conventions are described below according to an exemplary embodiment and using the example parameter x for simplifying discussion below. A dot accent (e.g., ẋ) denotes that this signal is a time derivative, i.e.

$$\dot{x} = \frac{dx}{dt}.$$

This signal may be integrated to obtain the original signal (plus initial conditions), i.e. $\int_0^t \dot{x}(\sigma)d\sigma = x(t)+x(0)$. A hat accent (e.g., x̂) denotes that this signal is an estimate or observer of the variable x. The term "estimate" is used when x is constant (or approximately so) and the term "observer" is used when x is time-varying. A tilde accent (e.g., x̃) denotes that this is an error signal. In the case of an estimator/observer error, x̃ is the difference between the estimate x̂ and the actual signal x, i.e., x̃=x−x̂. In addition, an arrow accent (e.g., $\vec{x}$) denotes that this is a vector signal (i.e., it has direction). As such this signal can be projected into constituent components on a given reference frame.

In addition, various operator conventions are used herein. Exemplary conventions are summarized here for simplicity of discussion. An ≜ operator denotes that the signal on the left-hand side of the equation is by definition equal to the terms on the right-hand side of the equation. This denotes that the given equation is not implicit from the model, but has been defined by the designer. Any user defined terms such as observers, estimators, and error signals will have an equation defining the form of those signals which uses ≜. The term 1/s is used to represent the standard Laplace integrator and may be commonly used in block diagrams to denote integration.

Figure 3:
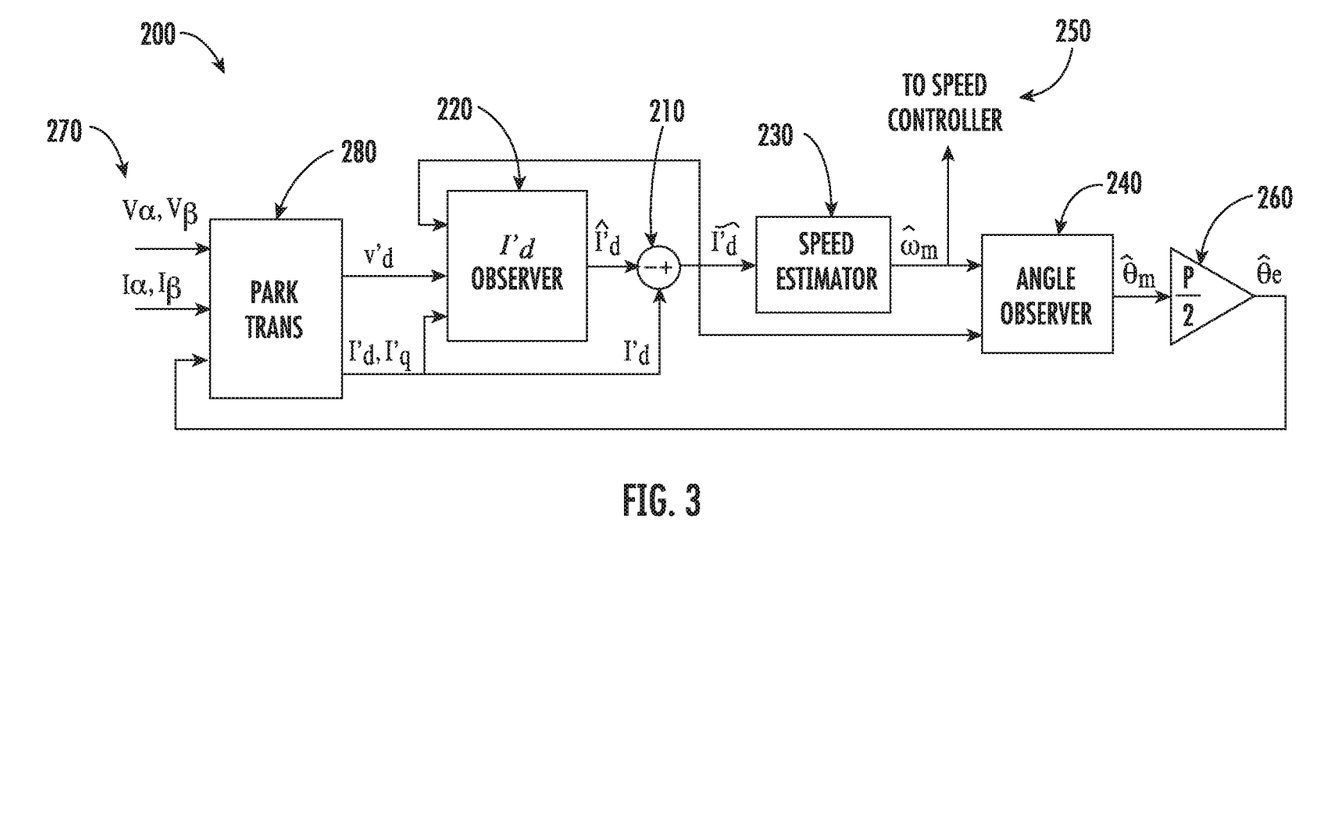
FIG. 3 provides an exemplary control schematic and method for regulating operation of the exemplary synchronous motor of FIG. 1 according to an exemplary embodiment.

Referring now to FIG. 3, an exemplary flow diagram or method 200 of operating a synchronous motor will be described according to an exemplary embodiment of the present subject matter. Method 200 may be used to operate any suitable motor. For example, method 200 may be used to operate synchronous motor 100 or may be adapted for controlling any other suitable motor type and configuration. According to an exemplary embodiment, controller 178 may be programmed or configured to implement method 200. Thus, method 200 is discussed in greater detail below with reference to operating synchronous motor 100 according to an exemplary control method.

A formulation of an induced stator current observer model is provided below for reference. This model may be used to determine the observed induced stator current ($\hat{I}_d'$) for use in determining the induced stator current error ($\tilde{I}_d'$). According to an exemplary embodiment, a mathematical model for a permanent-magnet synchronous machine (PMSM) can be represented in the αβ reference frame as follows:

$$\begin{bmatrix} v_\alpha \\ v_\beta \end{bmatrix} = \begin{bmatrix} R & 0 \\ 0 & R \end{bmatrix} \begin{bmatrix} I_\alpha \\ I_\beta \end{bmatrix} + \begin{bmatrix} L & 0 \\ 0 & L \end{bmatrix} \begin{bmatrix} \dot{I}_\alpha \\ \dot{I}_\beta \end{bmatrix} + k_e \dot{\theta}_e \begin{bmatrix} -\sin(\theta_e) \\ \cos(\theta_e) \end{bmatrix}$$

Notably, in the equation above, $k_e \dot{\theta}_e \sin(\theta_e)$ and $k_e \dot{\theta}_e \sin(\theta_e)$ are referred to as the αβ reference frame back electromotive forces (EMFs). In addition, $k_e$ is the back EMF constant which is based on the magnitude of the rotor magnetic field ($\vec{B}_r$).

According to an exemplary embodiment of the present subject matter, an observer solution is proposed which is based on a motor model (such as the PMSM model above) in the dq (direct-quadrature) rotating reference frame. This observer uses a single d-axis current error signal to directly estimate the rotor speed and angle. Because this current is in the dq-frame it has a DC value at steady-state, making it much easier to track. The dq transformation requires a reference angle. When the reference angle is $\theta_e$, the resulting PMSM model becomes:

$$\begin{bmatrix} v_d \\ v_q \end{bmatrix} = \begin{bmatrix} R & -\dot{\theta}_e L \\ \dot{\theta}_e L & R \end{bmatrix} \begin{bmatrix} I_d \\ I_q \end{bmatrix} + \begin{bmatrix} L & 0 \\ 0 & L \end{bmatrix} \begin{bmatrix} \dot{I}_d \\ \dot{I}_q \end{bmatrix} + k_e \dot{\theta}_e \begin{bmatrix} 0 \\ 1 \end{bmatrix}$$

Notably, in the above equation for the PMSM model in the dq frame, the d-axis back EMF is zero while q-axis back EMF is equal to $k_e \dot{\theta}_e$. Thus, the back EMF on the q-axis is constant for a constant rotor speed. Since $\theta_e$ is unknown, the model may instead be transformed about an estimated angle $\hat{\theta}_e$ (which is described below). Substituting $\hat{\theta}_e$ into the Park transformation results in the following model:

$$\begin{bmatrix} v_d' \\ v_q' \end{bmatrix} = \begin{bmatrix} R & -\dot{\hat{\theta}}_e L \\ \dot{\hat{\theta}}_e L & R \end{bmatrix} \begin{bmatrix} I_d' \\ I_q' \end{bmatrix} + \begin{bmatrix} L & 0 \\ 0 & L \end{bmatrix} \begin{bmatrix} \dot{I}_d' \\ \dot{I}_q' \end{bmatrix} + k_e \dot{\theta}_e \begin{bmatrix} -\sin(\tilde{\theta}_e) \\ \cos(\tilde{\theta}_e) \end{bmatrix}$$

where: $\tilde{\theta}_e \triangleq \theta_e - \hat{\theta}_e$

Notably, $\tilde{\theta}_e$ is the angle error, which is an unknown variable. In addition, the prime notation (') is used to differentiate the pair of axes defined by $\hat{\theta}_e$ from those defined by the actual $\theta_e$ as presented in the previous equations. Also notable is that as $\hat{\theta}_e$ approaches $\theta_e$, the two models and the associated variables become equivalent.

According to an exemplary embodiment of the present subject matter, the model below uses only the d'-axis equation from the above model. This equation is used because the term $\sin(\tilde{\theta}_e)$ behaves similarly to $\tilde{\theta}_e$ from $$-\frac{\pi}{2} \text{ to } \frac{\pi}{2}$$

and thus is useful for feedback in updating the angle estimate $\hat{\theta}_e$. Rewriting the d'-axis equation results in the following equation for the $I'_d$ dynamics:

$$L\dot{I}_d' = v_d' - RI_d' + \dot{\hat{\theta}}_e L I_q' + k_e \dot{\theta}_e \sin(\tilde{\theta}_e)$$

Notably, after $\dot{\hat{\theta}}_e$ is designed, all of the terms in the above equation are known except $k_e \dot{\theta}_e \sin(\tilde{\theta}_e)$. Therefore, exemplary aspects of the present subject matter include designing an observer for $I_d'$, denoted as $\hat{I}_d'$, which includes all other terms in the above model equation.

Referring again to FIG. 3, at the start of method 200, step 210 includes obtaining an induced stator current error projected onto a d'-axis within a direct-quadrature (d'q') rotating reference frame. For example, according to the illustrated exemplary embodiment, step 210 includes determining the induced stator current error projected onto the d'-axis by subtracting the observed induced stator current from the induced stator current. More specifically, from the observer specified above, the induced stator current error ($\tilde{I}_d'$) can be defined as:

$$\tilde{I}_d' \triangleq I_d' - \hat{I}_d'$$

Any error in the observer can be attributed to the uncompensated term $k_e \dot{\theta}_e \sin(\tilde{\theta}_e)$. In this manner, $\tilde{I}_d'$ can be used to update $\dot{\hat{\theta}}_e$. In summary, the induced stator current observer design may be implemented at step 220. Specifically, the induced current observer model may be used to calculate an observed induced stator current projected onto a d'-axis within a direct-quadrature (d'q') rotating reference frame using according to the following equation:

$$\hat{I}_d' \triangleq \frac{1}{L} \int \left[ v_d' - RI_d' + \dot{\hat{\omega}}_e L I_q' + k_1 \tilde{I}_d' \right]$$

Returning specifically to method 200 and FIG. 3, step 230 includes obtaining an observed angular speed ($\hat{\omega}_m$) of the rotor based at least in part on the induced stator current error ($\tilde{I}_d'$). For example, according to an exemplary embodiment, step 230 includes calculating the observed angular speed ($\hat{\omega}_m$) of the rotor using a speed estimation model based at least in part on the induced stator current error ($\tilde{I}_d'$). According to alternative embodiments, any suitable manner of determining or estimating the observed angular speed ($\hat{\omega}_m$) and the induced stator current error ($\tilde{I}_d'$) may be used while remaining within the scope of the present subject matter. According to one embodiment, the observed angular speed ($\hat{\omega}_m$) may be determined using the following speed estimation model:

$$\hat{\omega}_m \triangleq k_\omega \left( L\tilde{I}_d' + k_1 \int \tilde{I}_d' \right)$$

In the above equation, the rotor electrical frequency ($\hat{\omega}_m$) can be inferred base on the number of poles (P) as follows:

$$\hat{\omega}_e = \frac{P}{2} \hat{\omega}_m$$

Method 200 further includes, at step 240, calculating an observed rotor electrical angle ($\hat{\theta}_m$) of the rotor using a rotor angle observer model based on the angular speed ($\hat{\omega}$m) of the rotor and the induced stator current error ($\tilde{I}_d'$). For example, according to an exemplary embodiment, the observed rotor angle ($\hat{\theta}_m$) may be determined using the following rotor angle observer model:

$$\hat{\theta}_m \triangleq \int \left[ \hat{\omega}_m + (k_1 + 1) \tilde{I}_d' \right]$$

$$\hat{\theta}_e = \frac{P}{2}\hat{\theta}_m$$

where

As explained above, by knowing the observed rotor electrical angle ($\hat{\theta}_e$), the stator may be energized in a manner that produces a stator magnetic field ($\vec{B}_s$) having a speed and orientation for improved torque. Therefore, step 250 includes generating a stator magnetic field ($\vec{B}_s$) based at least in part on the observed rotor electrical angle ($\hat{\theta}_e$). Specifically, according to the illustrated exemplary embodiment, the observed angular speed ($\hat{\omega}_m$) may be transmitted to a speed controller that regulates the speed of the rotor, e.g., by adjusting the magnitude of the q-axis current. In addition, the rotor vector orientation of the rotor magnetic field ($\vec{B}_r$) may be determined based on the observed rotor angle ($\hat{\theta}_m$), and the stator magnetic field ($\vec{B}_s$) may be oriented 90° ahead of the rotor magnetic field ($\vec{B}_r$).

According to exemplary embodiments, method 200 may include additional steps for providing closed loop feedback to the model for updated the observed parameters and reducing the induced stator current error ($\tilde{I}_d'$). For example, step 260 includes obtaining an estimated electrical angle of the rotor ($\hat{\theta}_e$). Specifically, as explained above, the observed electrical angle of the rotor ($\hat{\theta}_e$) is a function of the mechanical angle of the rotor ($\hat{\theta}_m$) and the number of poles (P) in the stator, as specified above.

Notably, the electrical angle of the rotor may be used in performing a Park transformation of the stator currents and voltages. Specifically, step 270 includes obtaining an applied stator voltage and an induced stator current in windings of the stator in an αβ stationary reference frame. In addition, step 280 includes applying the Park transformation to calculate the applied stator voltage and the induced stator current in a dq rotating reference frame using the estimated electrical angle of the rotor. As explained in detail above, the Park transformation for voltages may be as follows:

$$\begin{bmatrix} v_d' \\ v_q' \end{bmatrix} = \begin{bmatrix} \cos(\hat{\theta}_e) & \sin(\hat{\theta}_e) \\ -\sin(\hat{\theta}_e) & \cos(\hat{\theta}_e) \end{bmatrix} \begin{bmatrix} v_\alpha \\ v_\beta \end{bmatrix}$$

FIG. 3 depicts an exemplary control method and models having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using synchronous motor 100 as an example, it should be appreciated that these methods may be applied to the operation of any suitable motor type and configuration.

FIG. 3 and the associated description provide an explanation and formulation of a rotor angle observer model and a rotor angular speed model that may be used to implement method 200 and to regulate the orientation of the stator magnetic field ($\vec{B}_s$) for improved motor operation. To simplify explanation of the formulation of these observer models, certain steps in the formulation process may be omitted, particularly where the mathematics are simple or the derivation is implied. The description of the control algorithm and method 200 are intended to describe only a single method of formulating rotor observer models and regulating a synchronous motor. According to alternative embodiments, assumptions may be made to simplify the calculation, e.g., where such an assumption simplifies the computational requirements of controller without sacrificing accuracy beyond a suitable degree.

Figure 4:
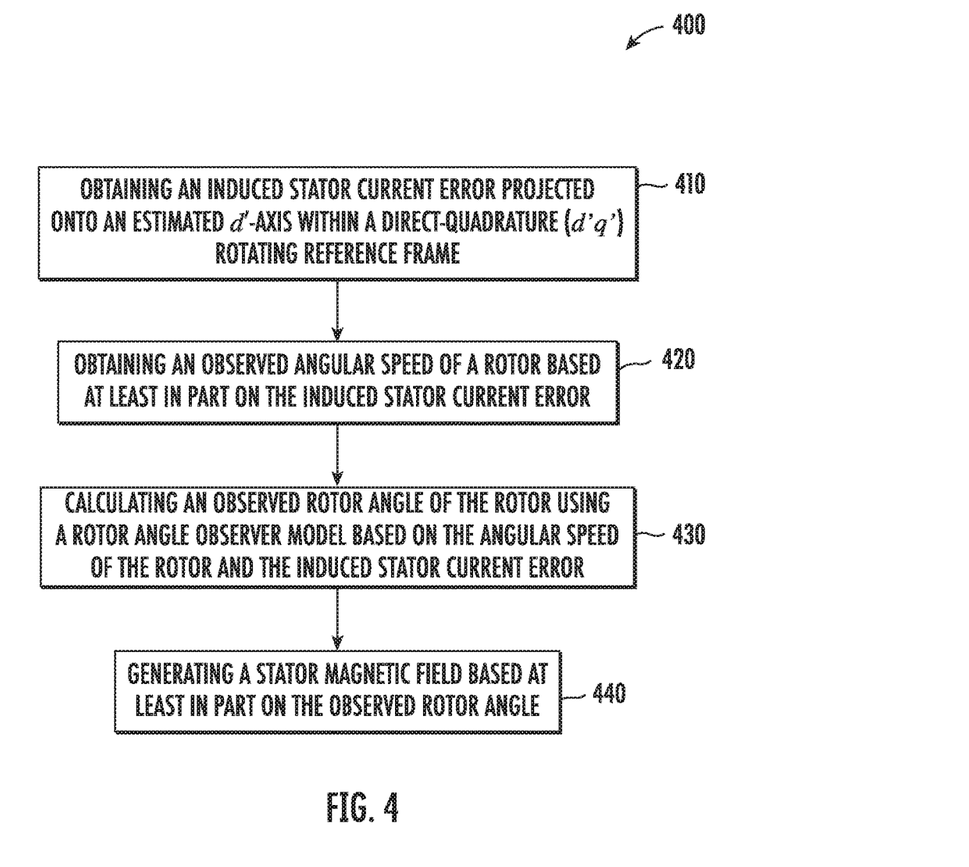
FIG. 4 provides an exemplary method for regulating operation of the exemplary synchronous motor of FIG. 1 according to an exemplary embodiment.

Referring now to FIG. 4, an exemplary method 400 for regulating operation of a synchronous motor will be described according to an exemplary embodiment. Specifically, method 400 includes, at step 410, obtaining an induced stator current error projected onto an estimated d'-axis within a direct-quadrature (d'q') rotating reference frame. Step 420 includes obtaining an observed angular speed of a rotor based at least in part on the induced stator current error. Step 430 includes calculating an observed rotor angle of the rotor using a rotor angle observer model based on the angular speed of the rotor and the induced stator current error. Step 440 includes generating a stator magnetic field based at least in part on the observed rotor angle.

Although the models used herein are developed for a synchronous motor, it should be appreciated that aspects of the present subject matter may also applied to other types of motors. For example, similar mathematical modeling of the mechanical dynamics associated with other motor types and configurations may be used. Thus, synchronous motor 100 is used herein only as an exemplary embodiment for the purpose of illustration and is not intended to limit the scope of the present subject matter in any manner.

In addition, the observer models rely on several assumptions which are described herein according to an exemplary embodiment. However, it should be appreciated that these assumptions may be manipulated or varied, other assumptions may be made, and other modifications may be made to the observer models while remaining within the present subject matter. For example, it should be noted that in the above modeling, the form of the observers and estimators are based on a Lyapunov Stability Analysis which proves analytically that $\tilde{I}_d'$, $\tilde{\theta}_e \to 0$ as $t \to \infty$ if we assume that $\omega_e$ is positive and approximately constant. For brevity and simplicity of discussion, this analysis is not described here.

Operation of synchronous motor 100 is controlled by a controller or processing device 178 (FIG. 1) that is operatively coupled to synchronous motor 100 for regulating operation of synchronous motor 100. Specifically, controller 178 is in operative communication with synchronous motor 100 and may selectively energize stator 102 to drive rotor 106 as described above. Thus, controller 178 may generally be configured for executing selected methods of operating synchronous motor 100, e.g., as described herein. As described in more detail below, controller 178 may include a memory and microprocessor, such as a general or special purpose microprocessor operable to execute programming instructions or micro-control code associated with methods described herein. Alternatively, controller 178 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Synchronous motor 100 may be in communication with controller 178 via one or more signal lines or shared communication busses.

FIG. 1 depicts certain components of controller 178 according to example embodiments of the present disclosure. Controller 178 can include one or more computing device(s) 180 which may be used to implement methods as described herein. Computing device(s) 180 can include one or more processor(s) 180A and one or more memory device(s) 180B. The one or more processor(s) 180A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180B can include one or more non-transitory computer-readable storage medium(s), such as RAM, ROM, EEPROM, EPROM, flash memory devices, magnetic disks, etc., and/or combinations thereof.

The memory device(s) 180B can include one or more computer-readable media and can store information accessible by the one or more processor(s) 180A, including instructions 180C that can be executed by the one or more processor(s) 180A. For instance, the memory device(s) 180B can store instructions 180C for running one or more software applications, displaying a user interface, receiving user input, processing user input, etc. In some implementations, the instructions 180C can be executed by the one or more processor(s) 180A to cause the one or more processor(s) 180A to perform operations, e.g., such as one or more portions of methods described herein. The instructions 180C can be software written in any suitable programming language or can be implemented in hardware. Additionally, and/or alternatively, the instructions 180C can be executed in logically and/or virtually separate threads on processor(s) 180A.

The one or more memory device(s) 180B can also store data 180D that can be retrieved, manipulated, created, or stored by the one or more processor(s) 180A. The data 180D can include, for instance, data to facilitate performance of methods described herein. The data 180D can be stored in one or more database(s). The one or more database(s) can be connected to controller 178 by a high bandwidth LAN or WAN, or can also be connected to controller through network(s) (not shown). The one or more database(s) can be split up so that they are located in multiple locales. In some implementations, the data 180D can be received from another device.

The computing device(s) 180 can also include a communication module or interface 180E used to communicate with one or more other component(s) of synchronous motor 100 over the network(s). The communication interface 180E can include any suitable components for interfacing with one or more network(s), including for example, transmitters, receivers, ports, controllers, antennas, or other suitable components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a synchronous motor comprising a rotor and a stator, the method comprising:
    obtaining an induced stator current error projected onto an estimated d'-axis within a direct-quadrature (d'q') rotating reference frame;
    obtaining an observed angular speed of the rotor based at least in part on the induced stator current error;
    calculating an observed rotor angle of the rotor using a rotor angle observer model based on the angular speed of the rotor and the induced stator current error; and
    generating a stator magnetic field based at least in part on the observed rotor angle.

2. The method of claim 1, wherein the rotor angle observer model comprises:

$\hat{\theta}_m \triangleq L\tilde{I}_d' + \int[\hat{\omega}m + (k_1+1)\tilde{I}_d']$ where:
    L is an inductance of windings of the stator;
    $\tilde{I}_d'$ is the induced stator current error projected onto the d'-axis;
    $\hat{\omega}_m$ is the observed angular speed of the rotor; and
    $k_1$ is a real, positive gain value.

3. The method of claim 1, wherein generating the stator magnetic field comprises:
    determining a rotor vector orientation of a rotor magnetic field based on the observed rotor angle; and
    generating the stator magnetic field having a stator vector orientation that is 90° ahead of the rotor vector orientation.

4. The method of claim 1, wherein the observed angular speed of the rotor is determined using the following speed estimation model:

$\hat{\omega}_m \triangleq k_\omega(L\tilde{I}_d' + k_1\int\tilde{I}_d')$ where:
    L is an inductance of the windings of the stator;
    $\tilde{I}_d'$ is the induced stator current error projected onto the d'-axis;
    $\hat{\omega}_m$ is the observed angular speed of the rotor;
    $k_1$ is a real, positive gain value; and
    $k_\omega$ is a real, positive gain value.

5. The method of claim 1, further comprising obtaining an observed induced stator current using an induced current observer model comprises:

$$\hat{I}_d' \triangleq \frac{1}{L}\int\left[v_d' - RI_d' + \hat{\omega}_e LI_q' + k_1\tilde{I}_d'\right]$$

where:
    L is an inductance of the windings of the stator;
    R is a resistance of the windings of the stator;
    $v_d'$ is an applied stator voltage projected onto the d'-axis;
    $I_d'$ is an induced stator current projected onto the d'-axis;
    $I_q'$ is an induced stator current projected onto a q'-axis;
    $\omega_m$ is the observed angular speed of the rotor;
    P is the number of poles in the stator;

$$\hat{\omega}_e = \frac{P}{2}\hat{\omega}_m;$$

and
    $k_1$ is a real, positive gain value.

6. The method of claim 1, further comprising:
    obtaining an applied stator voltage in windings of the synchronous motor in an αβ stationary reference frame; and
    determining the applied stator voltage in the d'q' reference frame using the following equation:

$$\begin{bmatrix} v'_d \\ v'_q \end{bmatrix} = \begin{bmatrix} \cos(\hat{\theta}_e) & \sin(\hat{\theta}_e) \\ -\sin(\hat{\theta}_e) & \cos(\hat{\theta}_e) \end{bmatrix} \begin{bmatrix} v_\alpha \\ v_\beta \end{bmatrix}$$

where:
$\hat{\theta}_m$ is an estimated mechanical angle of the rotor of the synchronous motor;
P is the number of poles in the stator of the synchronous motor;

$$\hat{\theta}_e = \frac{P}{2}\hat{\theta}_m;$$

$v_\alpha$ is the applied stator voltage projected onto an α-axis; and
$v_\beta$ is the applied stator voltage projected onto a β-axis.

7. The method of claim 1, further comprising:
obtaining an induced stator current in windings of the synchronous motor in an αβ stationary reference frame; and
determining the induced stator current in the d'q' reference frame using the following equation:

$$\begin{bmatrix} I'_d \\ I'_q \end{bmatrix} = \begin{bmatrix} \cos(\hat{\theta}_e) & \sin(\hat{\theta}_e) \\ -\sin(\hat{\theta}_e) & \cos(\hat{\theta}_e) \end{bmatrix} \begin{bmatrix} I_\alpha \\ I_\beta \end{bmatrix}$$

where:
$\hat{\theta}_m$ is an estimated mechanical angle of the rotor of the synchronous motor;
P is the number of poles in the stator of the synchronous motor;

$$\hat{\theta}_e = \frac{P}{2}\hat{\theta}_m;$$

$I_\alpha$ is the induced stator current projected onto an α-axis; and
$I_\beta$ is the induced stator current projected onto a β-axis.

8. The method of claim 1, wherein the observed angular speed of the rotor is used in a speed controller for regulating an actual angular speed of the rotor.

9. The method of claim 1, wherein the synchronous motor is a permanent-magnet synchronous machine (PMSM) that operates according to the following equation:

$$\begin{bmatrix} v_\alpha \\ v_\beta \end{bmatrix} = \begin{bmatrix} R & 0 \\ 0 & R \end{bmatrix}\begin{bmatrix} I_\alpha \\ I_\beta \end{bmatrix} + \begin{bmatrix} L & 0 \\ 0 & L \end{bmatrix}\begin{bmatrix} \dot{I}_\alpha \\ \dot{I}_\beta \end{bmatrix} + k_e\dot{\theta}_e\begin{bmatrix} -\sin(\theta_e) \\ \cos(\theta_e) \end{bmatrix}$$

where:
L is an inductance of the windings of the stator;
R is a resistance of the windings of the stator;
$v_\alpha$ is an applied stator voltage projected onto the α-axis;
$v_\beta$ is an applied stator voltage projected onto the β-axis;
$I_\alpha$ is an induced stator current projected onto the α-axis;
$I_\beta$ is an induced stator current projected onto the β-axis;
$\theta_m$ is the mechanical angle of the rotor;
P is the number of poles in the stator;

$$\hat{\theta}_e = \frac{P}{2}\hat{\theta}_m;$$

and
$k_e$ is a real, positive gain value.

10. A method for operating a synchronous motor comprising a rotor and a stator, the method comprising:
obtaining an estimated electrical angle of the rotor;
obtaining an applied stator voltage and an induced stator current in windings of the stator in an αβ stationary reference frame;
calculating the applied stator voltage and the induced stator current in a d'q' rotating reference frame using the estimated electrical angle of the rotor; and
calculating an observed induced stator current projected onto a d'-axis within a direct-quadrature (d'q') rotating reference frame using an induced current observer model.

11. The method of claim 10, wherein the induced current observer model comprises:

$$\hat{I}'_d \triangleq \frac{1}{L}\int\left[v'_d - RI'_d + \hat{\omega}_e LI'_q + k_1\tilde{I}'_d\right]$$

where:
L is an inductance of the windings of the stator;
R is a resistance of the windings of the stator;
$v_d'$ is an applied stator voltage projected onto the d'-axis;
$I_d'$ is an induced stator current projected onto the d'-axis;
$I_q'$ is an induced stator current projected onto a q'-axis;
$\hat{\omega}_m$ is an observed angular speed of the rotor;
P is the number of poles in the stator;

$$\hat{\omega}_e = \frac{P}{2}\hat{\omega}_m;$$

and
$k_1$ is a real, positive gain value.

12. The method of claim 10, further comprising:
determining an induced stator current error projected onto the d'-axis by subtracting the observed induced stator current from the induced stator current; and
calculating an observed angular speed of the rotor using a speed estimation model based at least in part on the induced stator current error.

13. The method of claim 12, wherein the speed estimation model comprises:

$$\hat{\omega}_m \triangleq k_\omega(L\tilde{I}'_d + k_1\int\tilde{I}'_d)$$

where:
L is an inductance of the windings of the stator;
$\tilde{I}_d'$ is the induced stator current error projected onto the d-axis;
$\hat{\omega}_m$ is the observed angular speed of the rotor;
$k_1$ is a real, positive gain value; and
$k_\omega$ is a real, positive gain value.

14. The method of claim 13, further comprising:
calculating an observed rotor angle using a rotor angle observer model based on the observed angular speed of the rotor and the induced stator current error.

15. The method of claim 14, wherein the rotor angle observer model comprises:

$$\hat{\theta}_m \triangleq L\tilde{I}_d' + f[\hat{\omega}m + (k_1+1)\tilde{I}_d']$$

16. The method of claim 14, further comprising:
generating a stator magnetic field based at least in part on the observed rotor angle.

17. The method of claim 16, wherein generating the stator magnetic field comprises:
determining a rotor vector orientation of a rotor magnetic field based on an observed rotor electrical angle; and
generating the stator magnetic field having a stator vector orientation that is 90° ahead of the rotor vector orientation.

18. The method of claim 10, wherein calculating the applied stator voltage in the d'q' rotating reference frame using the estimated electrical angle of the rotor comprises:
obtaining the applied stator voltage in windings of the synchronous motor in an αβ stationary reference frame; and
determining the applied stator voltage in the d'q' reference frame using the following equation:

$$\begin{bmatrix} v_d' \\ v_q' \end{bmatrix} = \begin{bmatrix} \cos(\hat{\theta}_e) & \sin(\hat{\theta}_e) \\ -\sin(\hat{\theta}_e) & \cos(\hat{\theta}_e) \end{bmatrix} \begin{bmatrix} v_\alpha \\ v_\beta \end{bmatrix}$$

where:
$\hat{\theta}_m$ is an estimated mechanical angle of the rotor of the synchronous motor;
P is the number of poles in the stator of the synchronous motor;

$$\hat{\theta}_e = \frac{P}{2}\hat{\theta}_m;$$

$v_\alpha$ is the applied stator voltage projected onto an α-axis; and
$v_\beta$ is the applied stator voltage projected onto a β-axis.

19. The method of claim 10, wherein calculating the induced stator current in the dq rotating reference frame using the estimated electrical angle of the rotor comprises:
obtaining the induced stator current in windings of the synchronous motor in an αβ stationary reference frame; and
determining the induced stator current in the d'q' reference frame using the following equation:

$$\begin{bmatrix} I_d' \\ I_q' \end{bmatrix} = \begin{bmatrix} \cos(\hat{\theta}_e) & \sin(\hat{\theta}) \\ -\sin(\hat{\theta}_e) & \cos(\hat{\theta}_e) \end{bmatrix} \begin{bmatrix} I_\alpha \\ I_\beta \end{bmatrix}$$

where:
$\hat{\theta}_m$ is an estimated mechanical angle of the rotor of the synchronous motor;
P is the number of poles in the stator of the synchronous motor;

$$\hat{\theta}_e = \frac{P}{2}\hat{\theta}_m;$$

$I_\alpha$ is the induced stator current projected onto an α-axis; and
$I_\beta$ is the induced stator current projected onto a β-axis.

20. The method of claim 10, wherein the synchronous motor is a permanent-magnet synchronous machine (PMSM) that operates according to the following equation:

$$\begin{bmatrix} v_\alpha \\ v_\beta \end{bmatrix} = \begin{bmatrix} R & 0 \\ 0 & R \end{bmatrix}\begin{bmatrix} I_\alpha \\ I_\beta \end{bmatrix} + \begin{bmatrix} L & 0 \\ 0 & L \end{bmatrix}\begin{bmatrix} \dot{I}_\alpha \\ \dot{I}_\beta \end{bmatrix} + k_e\dot{\theta}_e\begin{bmatrix} -\sin(\theta_e) \\ \cos(\theta_e) \end{bmatrix}$$

where:
L is an inductance of the windings of the stator;
R is a resistance of the windings of the stator;
$v_\alpha$ is an applied stator voltage projected onto an α-axis;
$v_\beta$ is an applied stator voltage projected onto a β-axis;
$I_\alpha$ is an induced stator current projected onto the α-axis;
$I_\beta$ is an induced stator current projected onto the β-axis;
$\theta_m$ is the mechanical angle of the rotor;
P is the number of poles in the stator;

$$\theta_e = \frac{P}{2}\theta_m;$$

and
$k_e$ is a real, positive gain value.

* * * * *